US012717742B2

(12) United States Patent
Chew

(10) Patent No.: US 12,717,742 B2
(45) Date of Patent: Aug. 25, 2026

(54) COMMUNICATION SYSTEM WITH IMPROVED SIGNAL DELAY AND SLAVE DEVICE AND OPERATING METHOD THEREOF

(71) Applicant: PIXART IMAGING INC., Hsin-Chu County (TW)

(72) Inventor: Yen-Hsiang Chew, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 474 days.

(21) Appl. No.: 18/494,971

(22) Filed: Oct. 26, 2023

(65) Prior Publication Data

US 2025/0139037 A1 May 1, 2025

(51) Int. Cl.
*G06F 13/36* (2006.01)
*G06F 13/362* (2006.01)
*G06F 13/42* (2006.01)

(52) U.S. Cl.
CPC ...... *G06F 13/3625* (2013.01); *G06F 13/4282* (2013.01)

(58) Field of Classification Search
CPC ............. G06F 13/3625; G06F 13/4282; G06F 13/385; G06F 13/4291; G06F 13/10; G06F 13/20; G06F 2213/00
See application file for complete search history.

(56) References Cited

U.S. PATENT DOCUMENTS

2020/0142855 A1* 5/2020 Biniguer ............ G06F 13/4295
2024/0322927 A1* 9/2024 Rajai .................... H04J 3/0664

* cited by examiner

*Primary Examiner* — Ernest Unelus
(74) *Attorney, Agent, or Firm* — HAUPTMAN HAM, LLP

(57) ABSTRACT

There is provided a communication system including a master device and a slave device. The master device includes a first interface port and a second interface port. When the master device runs a read operation, the first interface port is used to output a serial clock to the slave device. The slave device includes a clock generator used to generate a delayed serial clock having the same phase as read data according to the serial clock. The second interface port is used to receive the delayed serial clock and the read data to eliminate a time delay in a data transaction.

18 Claims, 9 Drawing Sheets

COMMUNICATION SYSTEM WITH IMPROVED SIGNAL DELAY AND SLAVE DEVICE AND OPERATING METHOD THEREOF

FIELD OF THE DISCLOSURE

This disclosure generally relates to a communication system and, more particularly, to a communication system adopting a serial peripheral interface (SPI) that improves a system operating frequency by reducing the signal time delay and an operating method thereof.

BACKGROUND OF THE DISCLOSURE

Please refer to FIG. 1, it is a schematic diagram of the connection of a conventional 4-wire SPI. A master is connected with a slave via a slave select (NCS/SS) line, a master-out-slave-in (MOSI) line, a serial clock (SCLK) line and a master-in-slave-out (MISO) line.

Please refer to FIG. 2 at the same time, when the master executes a read operation, the master firstly asserts the NCS to low, and then drives a read address on a MOSI pin thereof and drives 8-clocks on a SCLK pin thereof. After waiting for a time interval Tsrad, the master further drives 8-clocks to clock out read data from a MISO pin thereof. A length of the Tsrad is not particularly limited.

Please refer to FIG. 3, it is an enlarged diagram of a rectangle WOI in FIG. 2. FIG. 3 shows that there are three time delays when the master executes the read operation, including a clock propagation delay $t_{sclk}$, a slave's circuit delay $t_{sclk2miso}$ and a data propagation delay $t_{miso}$, which together form an invalid time. At a falling edge of the SCLK, the slave clocks out MISO data (shown as read data), and the master latches in the MISO data at a rising edge of the SCLK. Generally, the master requires a setup time to latch in the MISO data.

When an operating frequency of the SPI (i.e. frequency of SCLK) is increased, a period of the SCLK will be shortened. Due to the existence of the invalid time mentioned above, the setup time for latching in the MISO data by the master will be compressed such that a maximum operating frequency of the SPI is limited.

SUMMARY

Accordingly, the present disclosure provides a communication system that can eliminate the three delay times mentioned above to increase the maximum operating frequency of an SPI, and an operating of the communication system.

The present disclosure provides a communication system and an operating thereof that output a serial clock (SCLK) and receive a delayed SCLK respectively by two different SPI ports of a master device so as to eliminate the invalid time caused by the signal time delay during a read operation to solve the problem of the invalid time compressing a setup time for latching in MISO data by the maser device at a high operating frequency.

The present disclosure provides a communication system including a master device and a slave device. The master device has a first interface port and a second interface port. The slave device is configured to receive a serial clock (SCLK) from the first interface port via a first SCLK line, and output a delayed SCLK of the SCLK to the second interface port via a second SCLK line.

The present disclosure further provides a slave device adopting a serial peripheral interface and including a first SCLK pin, a clock generator, a second SCLK pin and a master-in-slave-out (MISO) pin. The first SCLK pin is configured to receive an SCLK. The clock generator is configured to generate a delayed SCLK of the SCLK. The second SCLK pin is configured to output the delayed SCLK. The MISO pin is configured to output read data.

The present disclosure further provides an operating method of a communication system adopting a serial peripheral interface. The communication system includes a master device and a slave device. The operating method includes the steps of: receiving, by the slave device, address data via a master-out-slave-in (MOSI) line and an SCLK via an SCLK line from the master device; upon identifying the address data indicating a read operation, outputting, by a clock generator of the slave device, a delayed SCLK of the SCLK to the master device; and upon identifying the address data indicating a write operation, stopping outputting the delayed SCLK by the clock generator.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a communication system that reduces or even eliminates a time delay between a serial clock (SCLK) and read data in performing a read operation of a serial peripheral interface (SPI). By arranging an additional clock generator in a slave device of the SPI to generate a delayed SCLK to be sent to a master device via an additional SCLK pin to eliminate the time delay. In this way, a maximum operating frequency of the SPI is increased.

Figure 4:
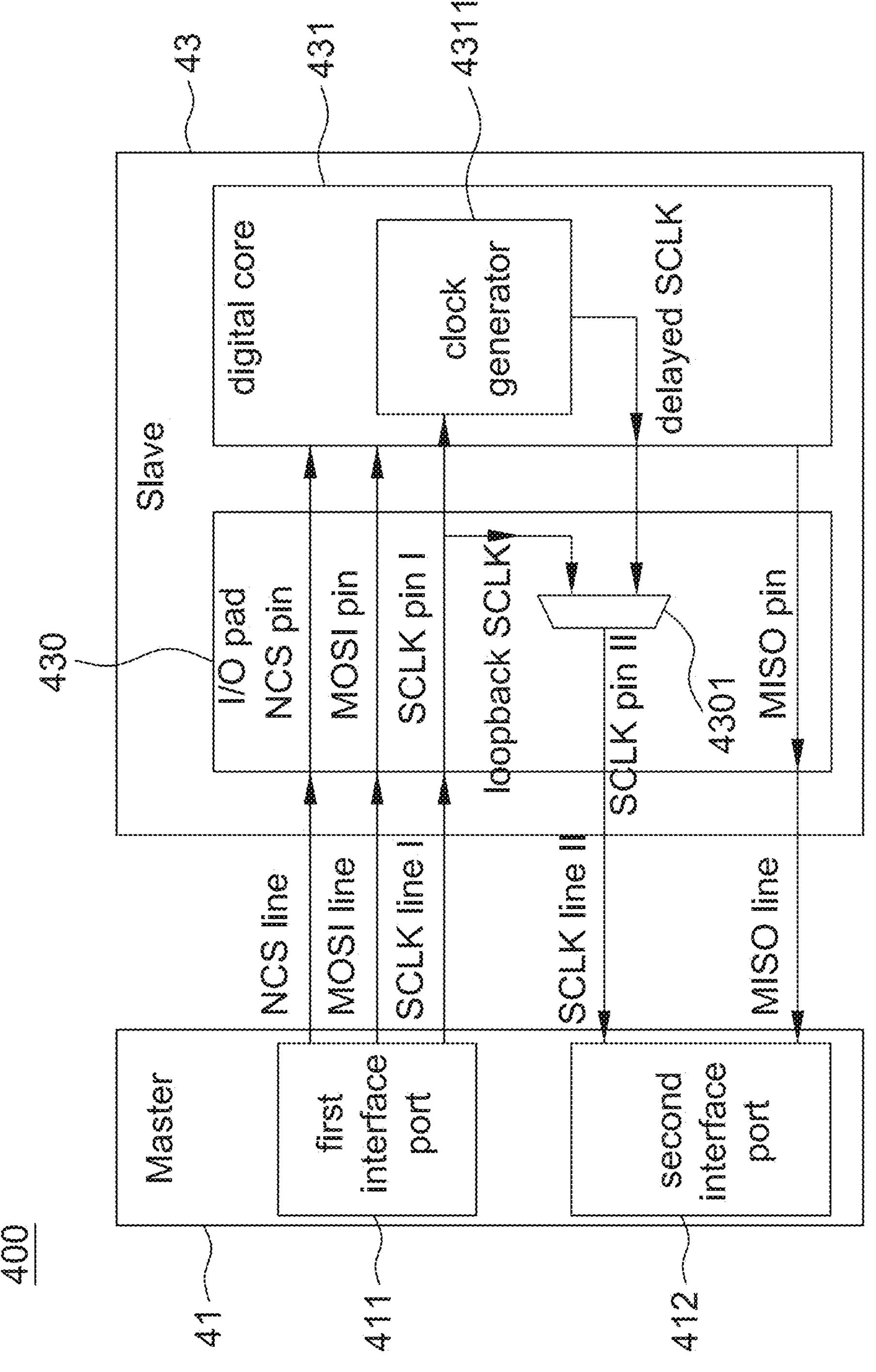
FIG. 4 is a schematic diagram of a connection of a communication system according to one embodiment of the present disclosure.

Please refer to FIG. 4, it is a schematic diagram of a connection of a communication system 400 according to one embodiment of the present disclosure. The communication system 400 includes a master device 41 (abbreviated as Master) and a slave device 43 (abbreviated as Slave), which are connected to each other via a slave select line (e.g., shown as NCS line), a master-out-slave-in line (e.g., shown as MOSI line), a first clock line (e.g., shown as SCLK line I), a second clock line (e.g., shown as SCLK line II) and a master-in-slave-out line (e.g., shown as MISO line). The master line 41 and the slave line 43 of the present disclosure communicate via five connection lines.

The slave device 43 may be a human input device (HID) such as an optical navigation sensor device, a mouse device, a keyboard device or a joystick device, or any other types of devices that are adapted to use an SPI interface without particular limitations. The master device 41 is a computing device coupled to the slave device 43, e.g., including a processor, a micro-controller unit (MCU), a desktop computer, a notebook computer, a workstation or other computing devices that are adapted to use an SPI interface without particular limitations.

In one aspect, the master device 41 includes a first interface port 411 and a second interface port 412. The first interface port 411 is coupled to the NCS line, the MOSI line and the SCLK line I. The second interface port 412 is coupled to the SCLK line II and the MISO line. The first interface port 411 and the second interface port 412 are SPI ports. In operation, the first interface port 411 is operated in a master mode, and the second interface port 412 is operated in a slave mode.

The slave device 43 includes an I/O pad 430 and a digital core 431. The I/O pad 430 receives signals/data via the connection lines mentioned above to be sent to the digital core 431, and outputs signals/data generated by the digital core 431 via the connection lines mentioned above to be sent to the master device 41.

The I/O pad 430 includes a slave select pin (e.g., shown as NCS pin), a master-out-slave-in pin (e.g., shown as MOSI pin), a first clock pin (e.g., shown as SCLK pin I), a second clock pin (e.g., shown as SCLK pin II) and a master-in-slave-out pin (e.g., shown as MISO pin).

The NCS pin is connected to the NCS line to receive a slave select signal NCS (e.g., referring to FIG. 8) from the master device 41. Details of an SPI sending the NCS from the master to the slave are known to the art, and thus are not described herein.

The MOSI pin is connected to the MOSI line to receive MOSI data from the master device 41, e.g., including address data and write data. Details of an SPI sending MOSI data from the master to the slave are known to the art, and thus are not described herein.

The SCLK pin I is coupled to the SCLK line I to receive an SCLK from the first interface port 411 of the master device 41. Details of an SPI sending the SCLK from the master to the slave are known to the art, and thus are not described herein.

The SCLK pin II is coupled to the SCLK line II to output a delayed SCLK of the SCLK to the second interface port 412 of the master device. In the present disclosure, the delayed SCLK is generated by a clock generator 4311 according to the SCLK and read data, and an example is given below for illustration purposes.

The MISO pin is coupled to the MISO line to output read data to the second interface port 412 of the master device 41 when the address data from the MOSI pin indicates a read operation. In the SPI, details of the slave sending the read data to the master according to the read address are known to the art, and thus are not described herein.

In one aspect, the clock generator 4311 is included in a digital core 431. The function of the clock generator 4311 is to cause a time delay between the delayed SCLK and the SCLK; e.g., to be between 10% and 40% of a period of the SCLK; so as to reduce a time difference between a falling edge of the SCLK and the read data, e.g., referring to FIG. 3. Preferably, the clock generator 4311 causes the time delay between the delayed SCLK and the SCLK to be identical to the signal delay (e.g., shown as $t_{sclk2miso}$) of the read data, e.g., referring to FIG. 8, to eliminate the time difference between the falling edge of the SCLK and the read data.

Figure 1:
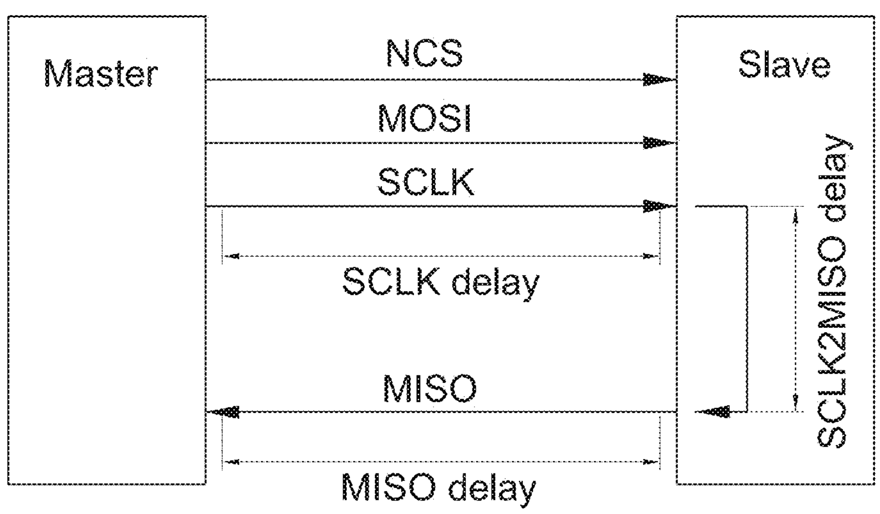
FIG. 1 is a schematic diagram of the connection of a conventional 4-wire SPI.
Figure 2:
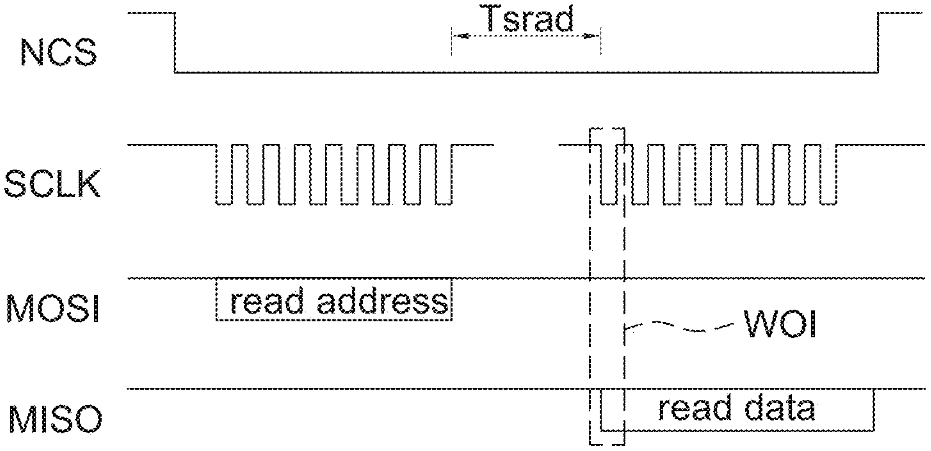
FIG. 2 is a schematic diagram of a read operation of a conventional 4-wire SPI.
Figure 3:
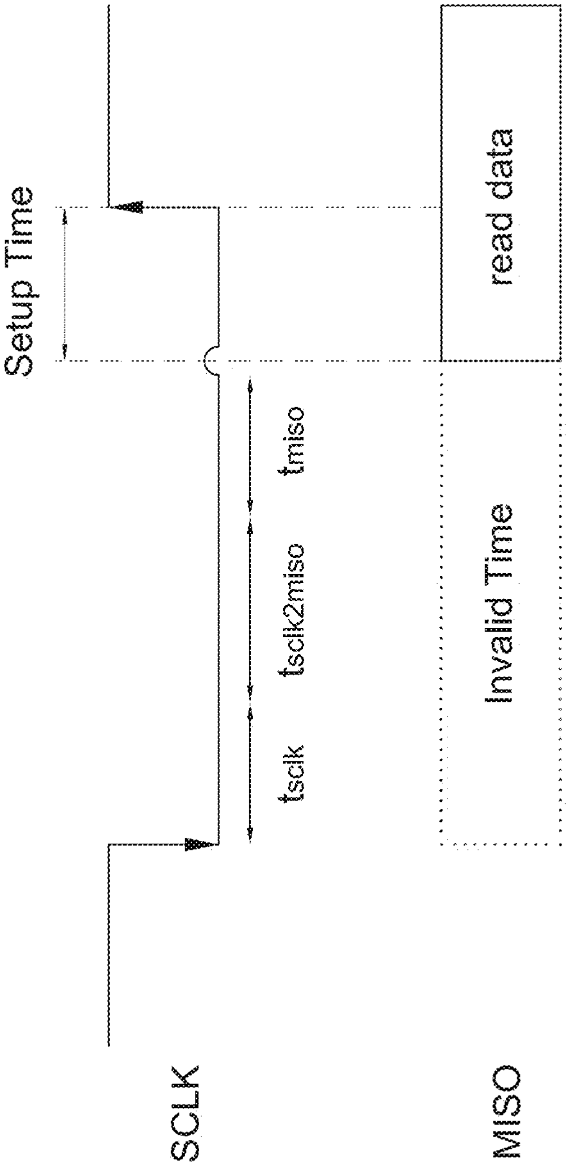
FIG. 3 is an enlarged diagram of a rectangle WOI in FIG. 2 showing signal time delays of a read operation.

The clock generator 4311 is arranged to generate a predetermined delay time to the SCLK, and the compression to the setup time is released as long as the invalid time shown in FIG. 3 is shortened without particular limitations.

Figure 6:
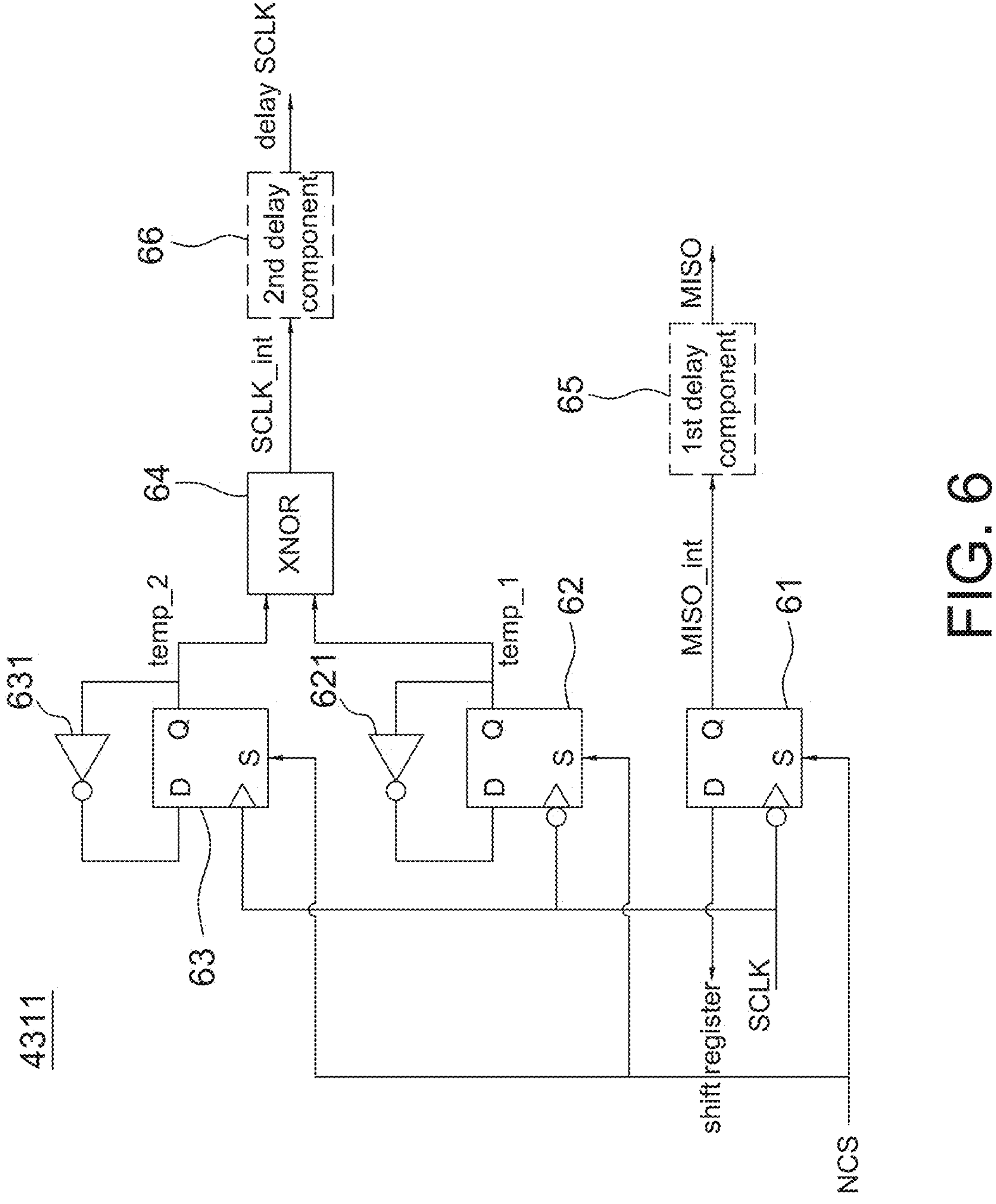
FIG. 6 is a schematic block diagram of a clock generator of a slave device of a communication system according to one embodiment of the present disclosure.

Please refer to FIG. 6, it is an example of the clock generator 4311, including a first flip flop 61, a second flip flop 62, a third flip flop 63 and an XNOR gate 64. An S-terminal of the first flip flop 61, the second flip flop 62 and the third flip flop 63 respectively receives the same NCS from the master device 41.

An input terminal D of the first flip flop 61 is coupled to a shift register of the slave device 43 to receive read data output therefrom. A clock input of the first flip flop 61 receives a reverse signal of the SCLK. An output terminal Q of the first flip flop 61 outputs the read data according to the reverse signal of the SCLK, e.g., shown as MISO_int, which is sent to the master device 41 via the MISO line.

An output terminal Q of the second flip flop 62 is connected to an input terminal D thereof via a NOT gate 621, and is used to output an output signal temp_1. A clock input of the second flip flop 62 receives a reverse signal of the SCLK.

An output terminal Q of the third flip flop 63 is connected to an input terminal D thereof via a NOT gate 631, and is used to output an output signal temp_2. A clock input of the third flip flop 63 receives the SCLK.

The XNOR 64 is connected to the output terminal Q of the second flip flop 62 and the third flip flop 63 to respectively receive the output signals temp_1 and temp_2, and to output a delayed SCLK by performing the XNOR operation on the output signals temp_1 and temp_2, e.g., shown as SCLK_int, which is sent to the master device 41 via the SCLK line II.

Figure 8:
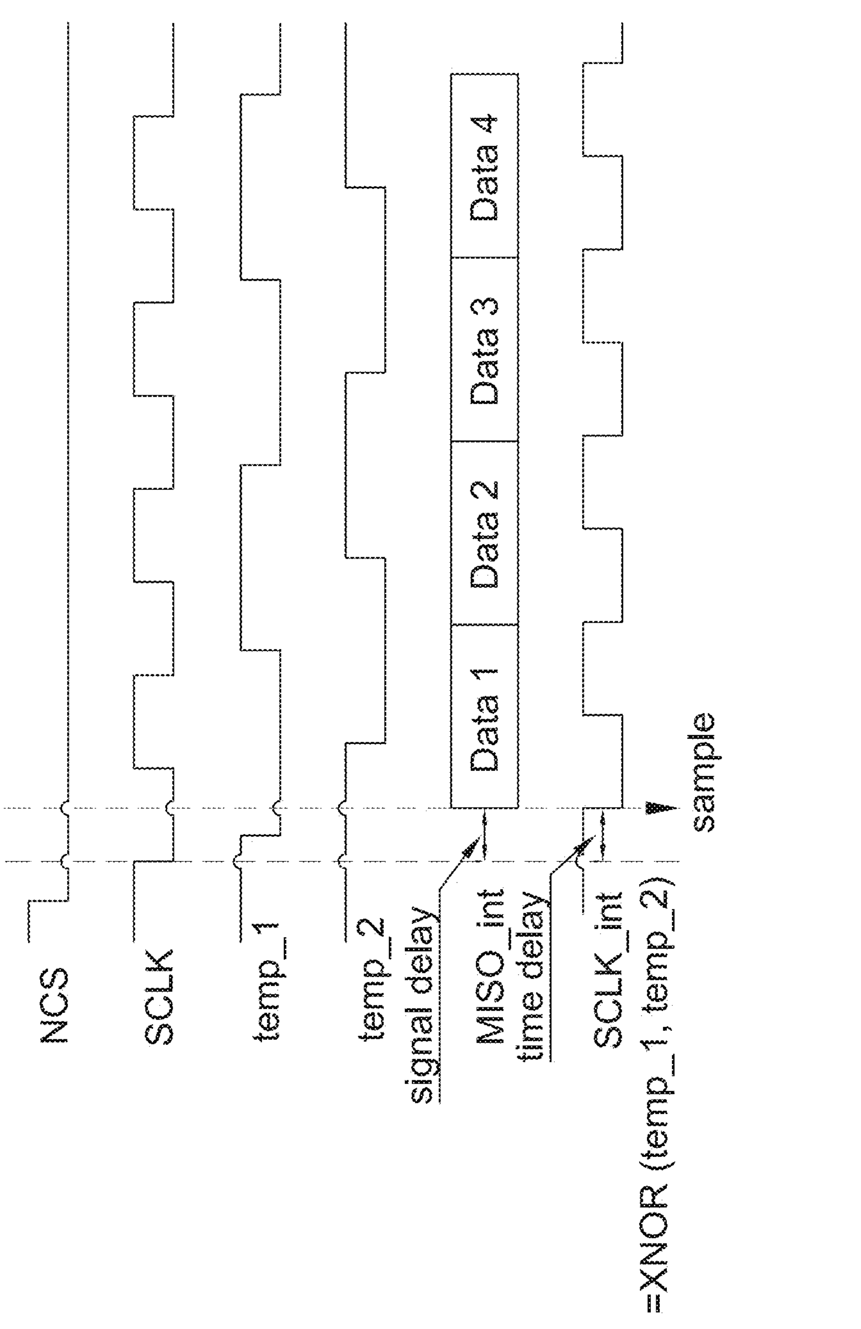
FIG. 8 is a signal timing diagram of read operation of a communication system according to one embodiment of the present disclosure showing a delayed SCLK and read data transmitted by a slave device.

The received signals (including NCS and SCLK) and outputted signals (including temp_1, temp_2, MISO_int and SCLK_int) of the first flip flop 61, the second flip flop 62 and the third flip flop 63 are shown in FIG. 8. Because the delayed SCLK (SCLK_int herein) and the read data MISO_int are sent to the second interface port 412 of the master device 41 respectively via the SCLK line II and the MISO line, the sampling of the master device 41 on the read data MISO_int does not have the delay shown in FIG. 3 when a time delay of SCLK_int is identical to a signal delay of MISO_int.

In one aspect, the route of the clock generator 4311 is arranged previously using an EDA place and route and timing tool to cause MISO_int and SCLK_int have substantially identical phases. The phases of the output signal temp_1 and temp_2 in FIG. 8 is determined according to the route of the clock generator 4311.

The route of the clock generator 4311 is fixed once the manufacturing thereof is accomplished. In another aspect, the slave device 43 further includes a first delay component 65 and a second delay component 66, referring to FIG. 6. The first delay component 65 is connected to the output terminal Q of the first flip flop 61 to fine tune the signal delay of MISO_int, referring to FIG. 8. The second delay component 66 is connected to an output terminal of the XNOR gate 64 to fine tune the time delay between the SCLK_int and the SCLK, referring to FIG. 8.

Figure 7:
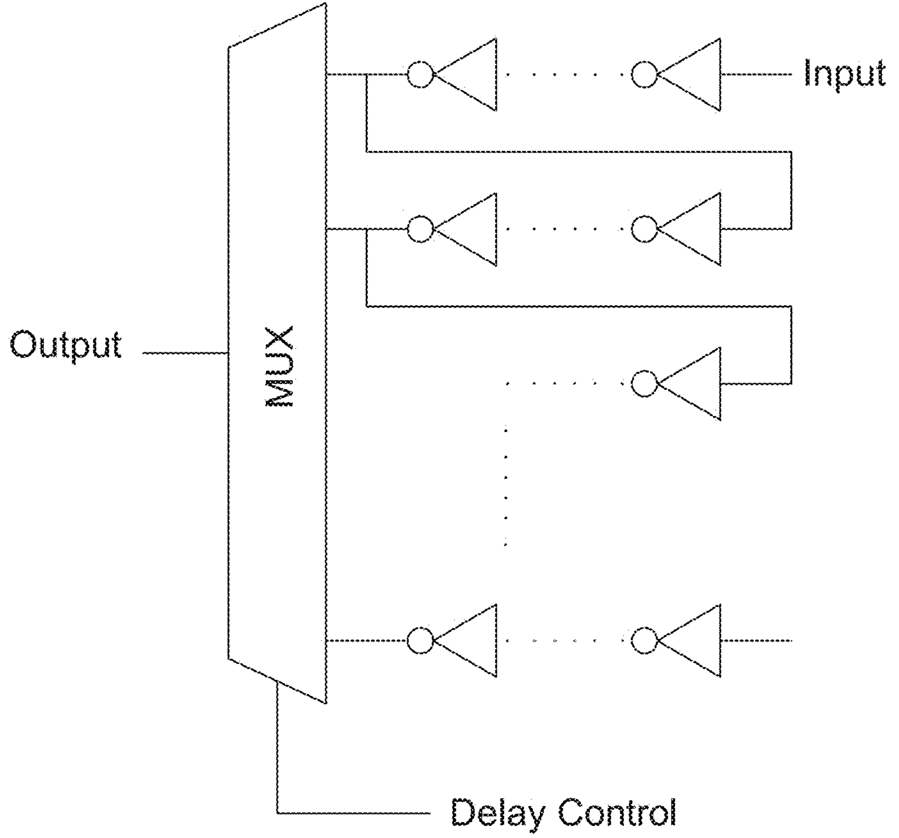
FIG. 7 is a schematic diagram of a time delay component of a slave device of a communication system according to one embodiment of the present disclosure.

Please refer to FIG. 7, it is an example of the first delay component 65 and the second delay component 66, including multiple combinations of multiple cascaded NOT gates as multiple inputs of a multiplexer (shown as MUX). According to the delay control, e.g., generated using EFUSE or a register, of the MUX, a programmable delay component is generated. In operation, the MISO_int and the SCLK_int respectively pass through different numbers of NOT gates (e.g., determined according to the delay control) to respectively adjust the delay time thereof. Preferably, no phase shift between the MISO_int and the SCLK_int is implemented as shown in FIG. 8 by using the delay components 65 and 66.

One objective of the present disclosure is to reduce or to even eliminate the time difference between the SCLK and the read data. In one aspect, upon identifying that the address data from the master device 41 indicates a write operation, the slave device 43 does not output the delayed SCLK. The method of indicating a read operation or a write operation by the address data is known to the art, and thus details thereof are not described herein.

Please refer to FIG. 4 again, in one aspect, the I/O pad 430 of the slave device 43 further includes a multiplexer 4301 with input terminals coupled to the SCLK pin I and the clock generator 4311. An output terminal of the multiplexer 4301 is coupled to the SCLK pin II. In this way, the multiplexer 4301 switches to output the delayed SCLK or the loopback SCLK to the master device 41. Please refer to FIG. 5 at the same time, one objective of the loopback SCLK is to eliminate the propagation delays $t_{sclk}$ and $t_{miso}$ as shown in FIG. 3, but the circuit delay $t_{sclk2miso}$ of the slave device 43 is not eliminated by the loopback SCLK. However, because the invalid time is shortened, the time difference between the SCLK and the read data is also shortened. In the present disclosure, the multiplexer 4301 is controlled to output the loopback SCLK or the delayed SCLK to the second interface port 412 of the master device 41 according to different applications.

Figure 5:
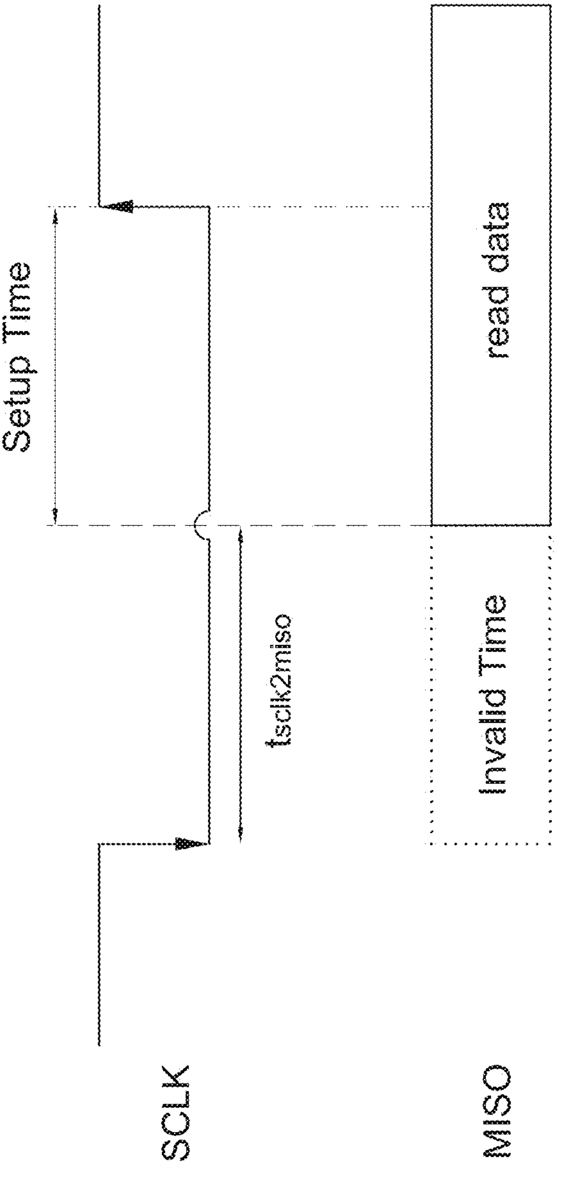
FIG. 5 is a schematic diagram of a signal time delay of loopbacking the serial clock by an I/O pad of a slave device of a communication system according to one embodiment of the present disclosure.
Figure 10:
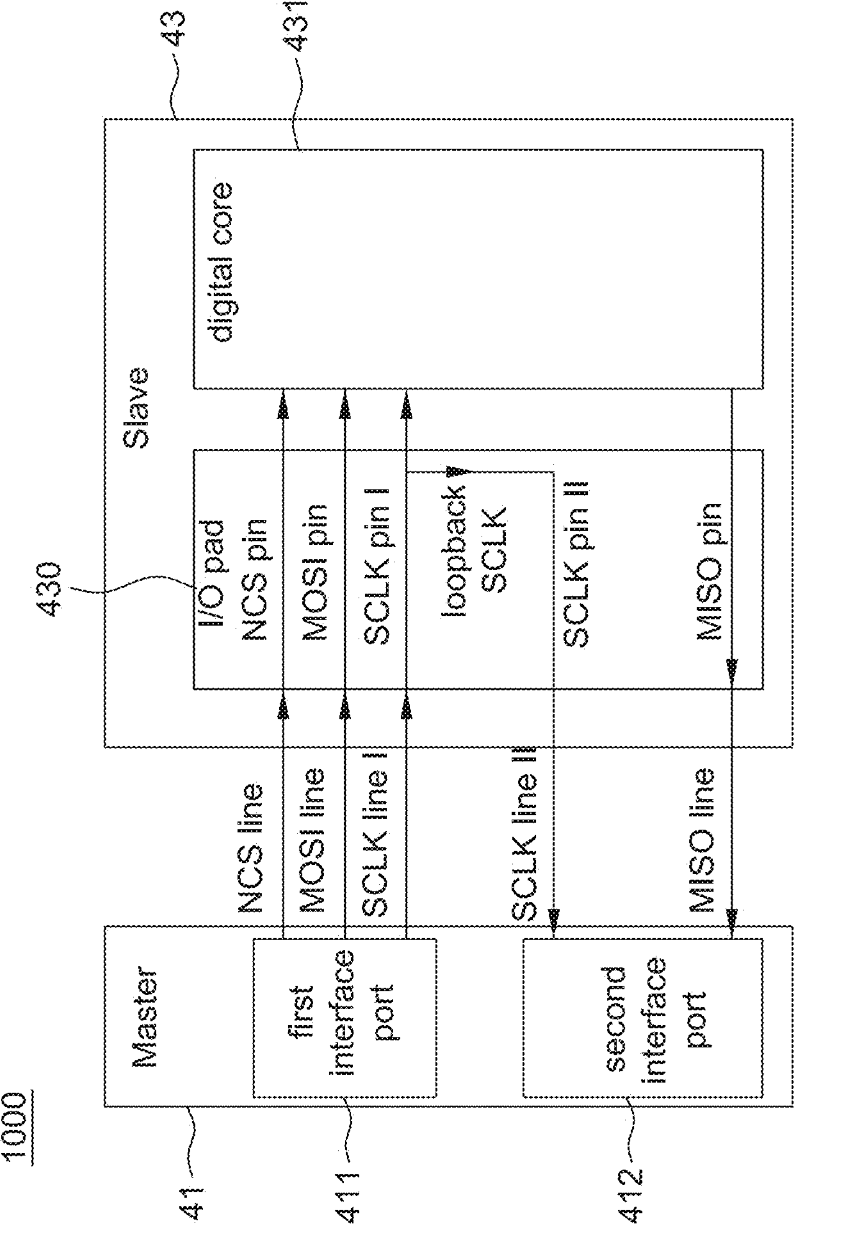
FIG. 10 is a schematic diagram of a connection of a communication system according to another embodiment of the present disclosure.

Preferably, a route propagation delay of the loopback SCLK matches a route propagation delay of the read data. In one aspect, the multiplexer 4301 and the loopback SCLK are optional and may not be implemented. In another aspect, the multiplexer 4301 and the clock generator 4311 are not implemented, e.g., shown as a communication system 1000 in FIG. 10, to eliminate the propagation delays $t_{sclk}$ and $t_{miso}$ in FIG. 3 to have only the circuit delay $t_{sclk2miso}$ as shown in FIG. 5. That is, there is no delayed SCLK in the embodiment of FIG. 10. The components in FIG. 10 identical to those shown in FIG. 4 are indicated by the same reference numerals and details thereof are not repeated herein.

Figure 9:
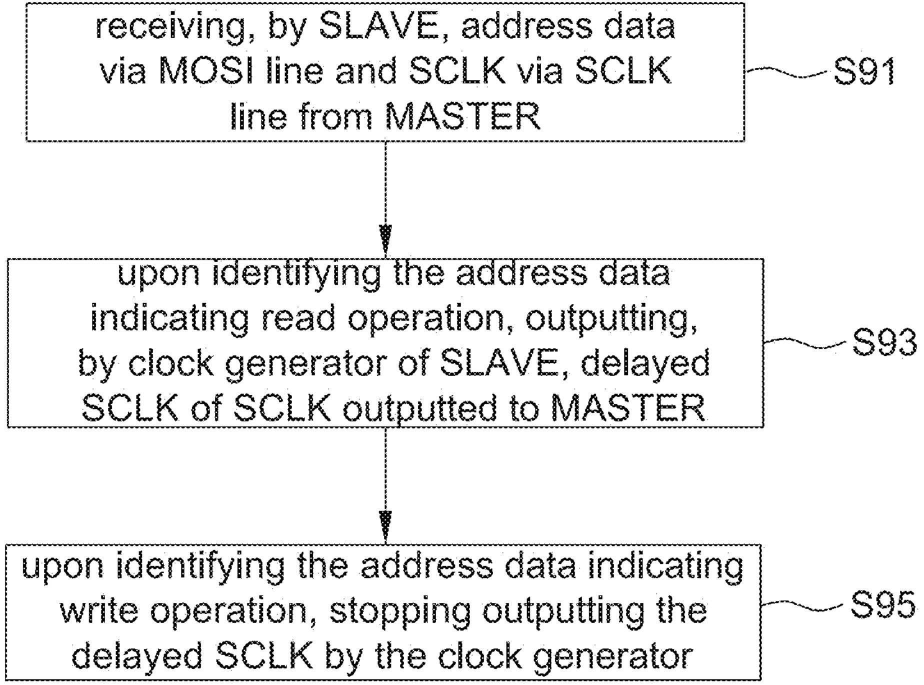
FIG. 9 is a flow chart of an operating method of communication system according to one embodiment of the present disclosure.

Please refer to FIG. 9, it is an operating method of a communication system adapted to the SPI, e.g., the communication system 400 in FIG. 4, according to one embodiment of the present disclosure. The operating method includes: receiving, by a slave device 43, address data via a master-out-slave-in (MOSI) line and an SCLK via an SCLK line from a master device 41, more specifically a first interface port 411 thereof (Step S91); upon identifying the address data indicating a read operation (i.e. being a read address), generating, by a clock generator 4311 of the slave device 43, a delayed SCLK of the SCLK to the master device 41, more specifically a second interface port 412 thereof (Step S92); and upon identifying the address data indicating a write operation (i.e. being a write address), stopping outputting the delayed SCLK by the clock generator 4311.

Details of this operating method have been described above, and thus are not repeated herein. One objective of this operating method is also to cause SCLK_int and MISO_int in FIG. 8 to have the same phase.

In the embodiments of the present disclosure, the master device 41 includes a first processor, e.g., micro controller unit (MCU), to perform the operations of the master device 41 using hardware, software and/or firmware, e.g., the first interface port 411 and the second interface port 412 being included in the first processor. The slave device 43 includes a second processor, e.g., digital signal processor (DSP) or an application specific integrated circuit (ASIC) to perform the operations of the slave device 43 using hardware, software and/or firmware, e.g., the digital core 431 being included in the second processor.

It should be mentioned that the temporal relationship shown in the present disclosure such as the time delay and the signal delay is only intended to illustrate but not to limit the present disclosure.

As mentioned above, the conventional 4-wire SPI has a time delay between the SCLK and read data in executing a read operation, and the time delay compresses a setup time of a master device to latch in the read data in high speed such that a maximum operating frequency of the SPI is limited. Accordingly, the present disclosure further provides a communication system (e.g., referring to FIG. 4) and an operating method thereof (e.g., referring to FIG. 9) that adopt an additional SCLK line to loopback the SCLK or a delayed SCLK to a master device to cause the master device to sample the read data according to the loopback SCLK or delayed SCLK. In this way, a time delay between the SCLK and the read data is reduced or even eliminated such that a limitation to the setup time of the master time to latch in the read data in high speed is removed to further increase the maximum operating frequency of the communication system.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A communication system, comprising:
- a master device, comprising a first interface port and a second interface port; and
- a slave device, configured to
  - receive a serial clock (SCLK) from the first interface port via a first SCLK line, and
  - output a delayed SCLK of the SCLK to the second interface port via a second SCLK line;
    - wherein the slave device comprises a clock generator configured to generate the delayed SCLK, and the clock generator comprises:
    - a first flip flop, an input terminal thereof connected to a shift register of the slave device, a clock input thereof configured to receive a reverse signal of the SCLK, and an output terminal thereof configured to output read data;

a second flip flop, an output terminal thereof connected to an input terminal thereof via a first NOT gate, and a clock input thereof configured to receive a reverse signal of the SCLK:

a third flip flop, an output terminal thereof connected to an input terminal thereof via a second NOT gate, and a clock input thereof configured to receive the SCLK; and an XNOR gate, directly connected to the output terminal of the second flip flop and the third flip flop to output the delayed SCLK.

2. The communication system as claimed in claim 1, wherein the first interface port and the second interface port are serial peripheral interface (SPI) ports, the first interface port is configured to operate in a master mode, and the second interface port is configured to operate in a slave mode.

3. The communication system as claimed in claim 1, wherein the slave device is further configured to transmit the read data to the master device via a master-in-slave-out (MISO) line, and a time delay between the delayed SCLK and the SCLK is configured to be close to or identical to a signal delay of the read data.

4. The communication system as claimed in claim 1, wherein an S-terminal of the first flip flop, the second flip flop and the third flip flop respectively receives a slave select signal from the master device.

5. The communication system as claimed in claim 1, wherein the slave device further comprises:

a first delay component, connected to the output terminal of the first flip flop to fine tune the signal delay, and a second delay component, connected to an output terminal of the XNOR gate to fine tune of the time delay.

6. The communication system as claimed in claim 1, wherein an I/O pad of the slave device comprises:

a first SCLK pin, connected to the first SCLK line;

a second SCLK pin, connected to the second SCLK line; and a multiplexer, input terminals thereof connected to the first SCLK pin and the clock generator, and an output terminal thereof connected to the second SCLK pin.

7. The communication system as claimed in claim 1, wherein a time delay between the delayed SCLK and the SCLK is between 10% and 40% of a period of the SCLK.

8. The communication system as claimed in claim 1, wherein the slave device is configured to receive address data via a master-out-slave-in (MOSI) line, and upon identifying that the address data indicates a write operation, the slave device is configured to not output the delayed SCLK.

9. A slave device adopting an SPI, the slave device comprising:

a first SCLK pin, configured to receive an SCLK;

a clock generator, configured to generate a delayed SCLK of the SCLK, wherein the clock generator comprises:

a first flip flop, an input terminal thereof connected to a shift register of the slave device, a clock input thereof configured to receive a reverse signal of the SCLK, and an output terminal thereof configured to output the read data;

a second flip flop, an output terminal thereof connected to an input terminal thereof via a first NOT gate, and a clock input thereof configured to receive a reverse signal of the SCLK;

a third flip flop, an output terminal thereof connected to an input terminal thereof via a second NOT gate, and a clock input thereof configured to receive the SCLK; and an XNOR gate, directly connected to the output terminal of the second flip flop and the third flip flop to output the delayed SCLK;

a second SCLK pin, configured to output the delayed SCLK; and a master-in-slave-out (MISO) pin, configured to output read data to a master device.

10. The slave device as claimed in claim 9, wherein an S-terminal of the first flip flop, the second flip flop and the third flip flop respectively receives a slave select signal.

11. The slave device as claimed in claim 9, further comprising:

a first delay component, connected to the output terminal of the first flip flop to fine tune a signal delay of the read data, and a second delay component, connected to an output terminal of the XNOR gate to fine tune of a time delay between the delayed SCLK and the SCLK.

12. The slave device as claimed in claim 9, further comprising:

a multiplexer, input terminals thereof connected to the first SCLK pin and the clock generator, and an output terminal thereof connected to the second SCLK pin.

13. The slave device as claimed in claim 9, wherein a time delay between the delayed SCLK and the SCLK is between 10% and 40% of a period of the SCLK.

14. The slave device as claimed in claim 9, wherein the slave device further comprises a master-out-slave-in (MOSI) pin configured to receive address data, and upon identifying that the address data indicates a write operation, the slave device is configured to not output the delayed SCLK.

15. An operating method of a communication system adopting an SPI, the communication system comprising a master device and a slave device, the operating method comprising:

receiving, by the slave device, address data via a master-out-slave-in (MOSI) line and an SCLK via an SCLK line from the master device;

upon identifying the address data indicating a read operation, outputting, by a clock generator of the slave device, a delayed SCLK of the SCLK to the master device, wherein the clock generator comprises:

a first flip flop, an input terminal thereof connected to a shift register of the slave device, a clock input thereof configured to receive a reverse signal of the SCLK, and an output terminal thereof configured to output the read data;

a second flip flop, an output terminal thereof connected to an input terminal thereof via a first NOT gate, and a clock input thereof configured to receive a reverse signal of the SCLK;

a third flip flop, an output terminal thereof connected to an input terminal thereof via a second NOT gate, and a clock input thereof configured to receive the SCLK; and an XNOR gate, directly connected to the output terminal of the second flip flop and the third flip flop to output the delayed SCLK; and upon identifying the address data indicating a write operation, stopping outputting the delayed SCLK by the clock generator.

16. The operating method as claimed in claim 12, wherein a time delay between the delayed SCLK and the SCLK is between 10% and 40% of a period of the SCLK.

17. The operating method as claimed in claim 15, wherein the slave device comprises a multiplexer, and the operating method further comprising:

switching to output, by the multiplexer, the delayed SCLK or loopback SCLK to the master device.

18. The operating method as claimed in claim 15, wherein the master device comprises a first interface port and a second interface port, and the operating method further comprises:

outputting the SCLK by the first interface port; and receiving the delayed SCLK by the second interface port.

* * * * *